(12) United States Patent
Katagiri et al.

(10) Patent No.: US 6,638,651 B2
(45) Date of Patent: Oct. 28, 2003

(54) HUMIDIFYING SYSTEM FOR FUEL CELL

(75) Inventors: Toshikatsu Katagiri, Wako (JP); Hiroshi Shimanuki, Wako (JP); Motohiro Suzuki, Wako (JP); Yoshio Kusano, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 179 days.

(21) Appl. No.: 09/774,373

(22) Filed: Jan. 30, 2001

(65) Prior Publication Data

US 2001/0010871 A1 Aug. 2, 2001

(30) Foreign Application Priority Data

Jan. 31, 2000 (JP) ........................................ 2000-023225

(51) Int. Cl.[7] ................................................ H01M 8/04
(52) U.S. Cl. .......................................... 429/13; 429/24
(58) Field of Search ............................. 429/13, 22, 24, 429/20, 19, 26

(56) References Cited

U.S. PATENT DOCUMENTS 6,106,964 A  * 8/2000 Voss et al. .................... 429/20
6,379,829 B1 * 4/2002 Kurita ........................... 429/17
6,436,562 B1 * 8/2002 DuBose ........................ 429/13

FOREIGN PATENT DOCUMENTS

JP          8-273687    * 10/1996

* cited by examiner

Primary Examiner—Randy Gulakowski
Assistant Examiner—Monique Wills
(74) Attorney, Agent, or Firm—Lahive & Cockfield, LLP

(57) ABSTRACT

A humidifying system for a fuel cell, the system producing a highly wet air by allowing dry air to pass through a water permeable humidifier, and supplying the highly wet gas to a fuel cell, wherein the humidifying system comprises a supercharger between an inlet for introducing gas into the fuel cell and an outlet for releasing gas from the humidifier. Since the pressure at the inlet of the supercharger is lower than the pressure at the outlet, the flow velocity at the inlet is higher than the flow velocity at the outlet. Therefore, the flow velocity of the dry air which flows inside the humidifier can be increased so as to be higher than the flow velocity in the case where the supercharger 3 is provided between the inlet for introducing gas into the fuel cell and a gas intake opening. Accordingly, the efficiency of humidification is improved, and the sizes of the humidifier and the supercharger can be reduced.

8 Claims, 5 Drawing Sheets

HUMIDIFYING SYSTEM FOR FUEL CELL

BACKGROUND OF THE INVENTION

1. Field of the Invention

The present invention relates to a humidifying system for a fuel cell, the system humidifying a gas to be humidified and supplying the gas to the fuel cell. In particular, present invention relates a technique which is effective in improving efficiency of humidification.

2. Description of Related Art

A fuel cell having a solid polymer membrane as an electrolyte membrane, for example, comprises a stack of a plurality of single cells which are layered.

Each single cell comprises a solid polymer membrane which has ionic conduction and anode and cathode electrodes held on the membrane in contact therewith. Hydrogen is supplied to a path for a fuel gas which is formed as a groove on the side of the membrane which is in contact with the anode electrode, while air is supplied to a path for an oxidizer which is formed as a groove on the side of the membrane which is in contact with the cathode electrode, and then electric power is generated by the electrochemical reaction which occurs between the electrodes in each single cell.

At this time, in order to keep the efficiency of power generation high, the solid polymer membrane must be maintained to be saturated with water so as to ensure the function of the membrane as a proton (hydrogen ion) conductive electrolyte.

However, during generation of electric power, dehydration of the solid polymer membrane may proceed due to loss of water produced by the electrochemical reaction from the system.

Accordingly, in order to maintain good ionic conduction, moisture must be supplied to the solid polymer membrane.

For example, Japanese Unexamined Patent Application, First Publication (Kokai), No. Hei 8-273687 discloses a humidifying system for a fuel cell which enables moisture supply to the solid polymer membrane by allowing air, which is to be supplied to the path in the stack for an oxidizer, to pass through a water permeable humidifier in advance in order to humidify the air.

This humidifier has a structure similar to a multitubular heat exchanger, that is, a structure by which air can be allowed to flow inside hollow portions of a hollow fiber membrane bundle which is an assembly of hollow fiber membranes while water can be allowed to flow inside a jacket which houses the hollow fiber membrane bundle.

The hollow fiber membranes are characterized by permitting permeation of water while inhibiting permeation of gas. Thus, the hollow fiber membranes function as water exchange membranes by allowing water to penetrate through from a side on which the partial pressure of water vapor is high to a side on which the partial pressure of water vapor is low.

Accordingly, when water is allowed to flow inside the jacket, the water permeates through each hollow fiber membrane and diffuses inside the hollow portion of each hollow fiber membrane as water vapor, and thus the air which flows inside the hollow portion of each hollow fiber membrane can be humidified.

It should be noted that, in order to supply air to the humidifier and the fuel cell, a device for taking in outside air and conveying it by compression, such as a supercharger, is required.

FIG. 5 is a block diagram of a system showing a conventional example of humidifying system for a fuel cell. In the figure, reference numeral 101 indicates the fuel cell, 102 indicates a humidifier, 103 indicates an intercooler, 104 indicates a supercharger, and 105 indicates a pressure-regulating valve.

In this humidifying system for the fuel cell, the supercharger 104 is disposed upstream of the humidifier 102 in the direction of air flow from outside. The outside air is taken in by this supercharger 104 and is conveyed to the humidifier 102 by compression. Wet air obtained by humidifying the outside air in the humidifier 102 is supplied to the fuel cell 101.

However, the disposition of the supercharger 104 in the upstream of the humidifier 102 in the direction of air flow from outside requires a high pressure of air from outside to be supplied to the humidifier 102, and causes a problem that a high efficiency of humidification cannot be achieved. This is because of the following reason:

Since the driving force for the permeation of water is generated due to the difference in the partial pressure of water vapor, the efficiency of humidification can be improved by increasing the flow velocity of the air from outside rather than retaining the air from outside within the hollow portions of the hollow fiber membranes.

Accordingly, under the condition of a constant flow rate, when the air from outside under a high pressure is supplied into the hollow fiber membranes, the flow velocity of the air from outside which flows inside the hollow portions of the hollow fiber membranes is decreased, and the efficiency of humidification is also decreased.

This is also apparent from the pressure-dependent property of hollow fiber membranes (FIG. 6) and the water collecting property of hollow fiber membranes using air from outside (FIG. 7).

Accordingly, the conventional humidifying system for the fuel cell is defective in that the humidifier 102 and the supercharger 104 must be unavoidably large if achievement of a high efficiency of humidification is intended.

BRIEF SUMMARY OF THE INVENTION

The present invention has been achieved in view of the above circumstances, and the object of the present invention is to improve the efficiency of humidification so as to be able to reduce the sizes of the humidifier and the supercharger.

In order to solve the above problems, the present invention employs the following constitution:

a humidifying system for a fuel cell, the system producing a wet gas (highly wet air Aw) by allowing a gas (dry air Ad), which is to be humidified, to pass through a water permeable humidifier (4), and supplying the wet gas to a fuel cell (1), the humidifying system comprising a supercharger (3) between an inlet (47) for introducing the wet gas into the fuel cell (1) and an outlet (48) for releasing the wet gas from the humidifier.

Work L done by a supercharger is expressed by the following formula:

$$L = G \times 4.186 \times C \times (T + 273.15) \times (\pi c^{(kc-1)/kc} - 1) \quad (1)$$

wherein

G: Flow rate (constant)

C: Specific heat of gas at inlet

T: Temperature of gas at inlet kc: Ratio of specific heat of gas at inlet

πc: Compressor pressure ratio.

πc is given as follows by solving formula (1) for πc:

$$\pi c = (L/(G \times 4.186 \times C \times (T+273.15)))^{kc/(kc-1)} \quad (2)$$

It is apparent from formula (2) that $$\pi c > 1 \quad (3)$$

On the other, since the following formula holds true:

$$\pi c = Pout/Pin \quad (4)$$

the relation between a pressure Pin of gas at the inlet and a pressure Pout of gas at the outlet is as follows from formulae (3) and (4):

Pressure Pout of gas at outlet

>Pressure Pin of gas at inlet  (5)

From formula (5), the following relation can be established when the flow rate G is constant:

Flow velocity Vin of gas at inlet

>Flow velocity Vout of gas at outlet  (6)

As described above, according to the present invention, since a supercharger is provided between an inlet for introducing gas into a fuel cell and an outlet for releasing gas from a humidifier, the flow velocity of the gas to be humidified which flows inside the humidifier can be increased in comparison with a system in which a supercharger is provided between an inlet for introducing gas into a humidifier and a supply source of the gas to be humidified, and thus the efficiency of humidification can be improved, and the sizes of the humidifier and the supercharger can be reduced.

In addition, the efficiency of supercharging can also be improved since a wet gas released from the humidifier can be supplied to the supercharger.

DETAILED DESCRIPTION OF THE INVENTION

In the following, an embodiment of the present invention will be described with reference to drawings.

However, in this embodiment, the structure of a fuel cell and the structures of hollow fiber membranes as water permeable membranes are the same as those described with respect to the related art, description of these structures are omitted.

Figure 1:
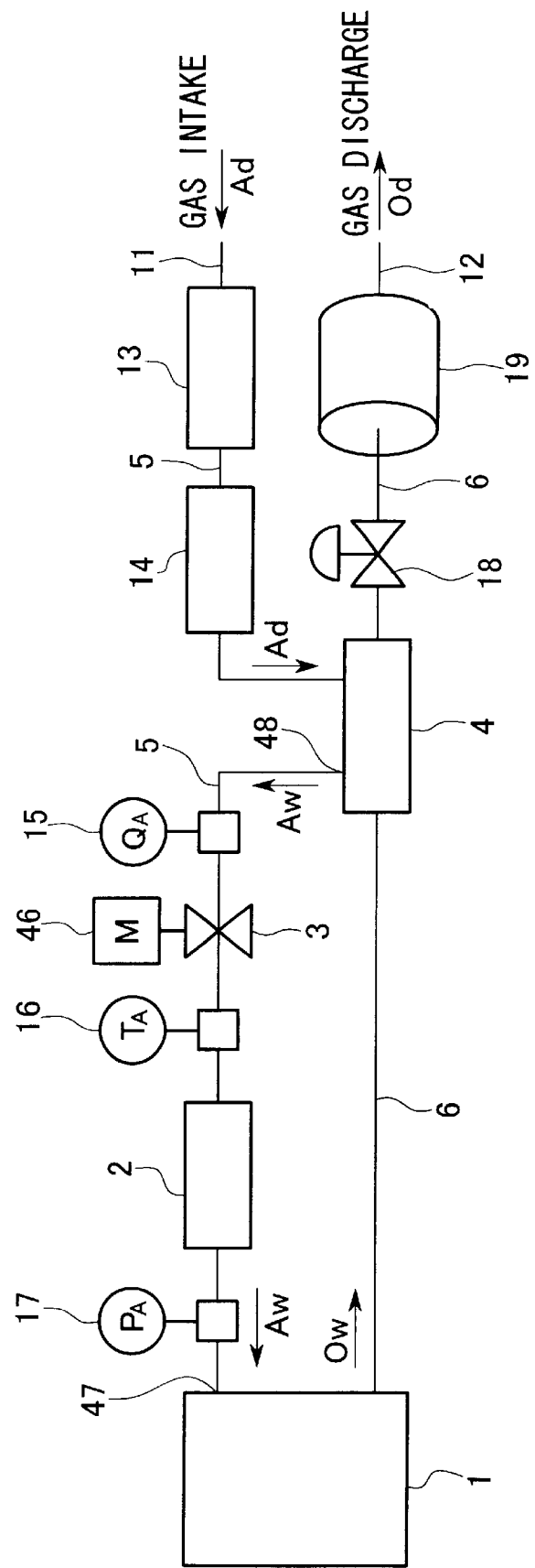
FIG. 1 is a system block diagram of a humidifying system for a fuel cell according to the first embodiment of the present invention.
Figure 2:
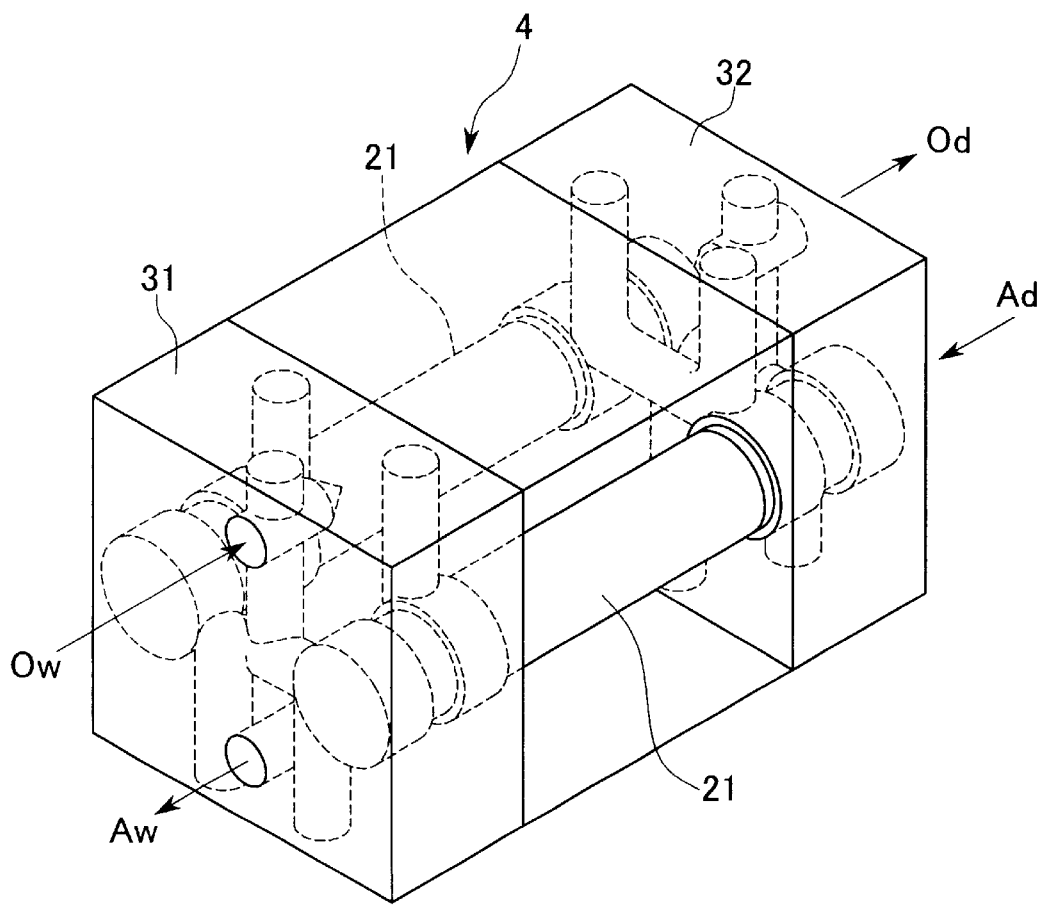
FIG. 2 is a perspective view of the humidifier.
Figure 3:
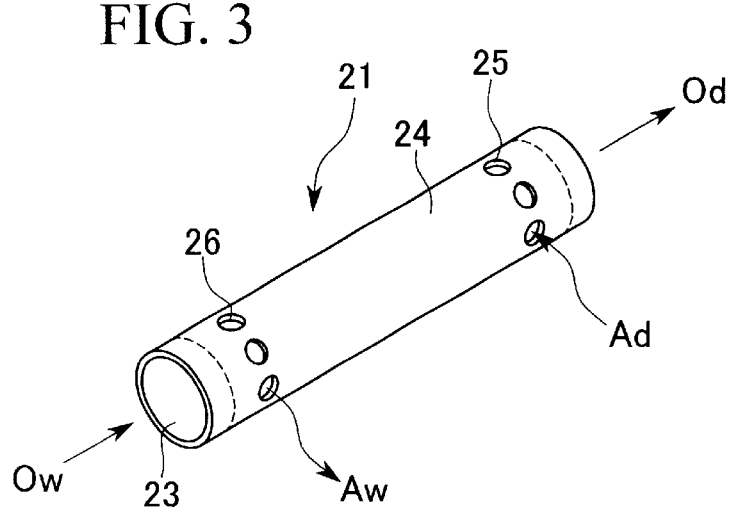
FIG. 3 is a perspective view of a module disposed in the humidifier.
Figure 4:
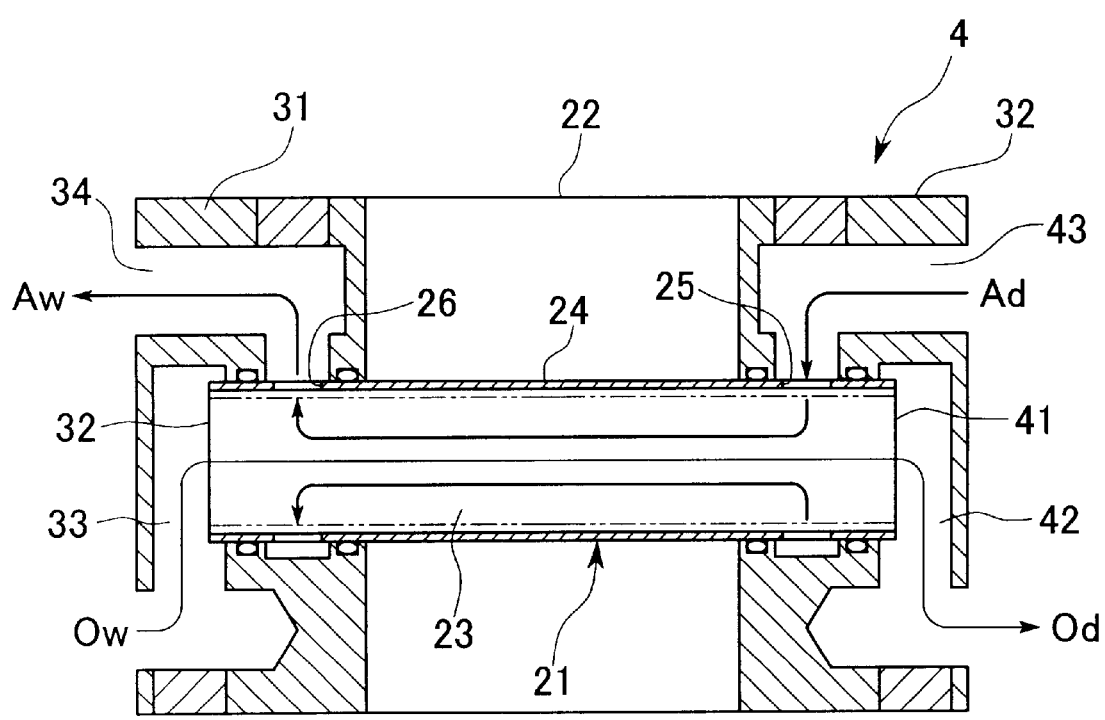
FIG. 4 is a longitudinal sectional view of the humidifier.
Figure 5:
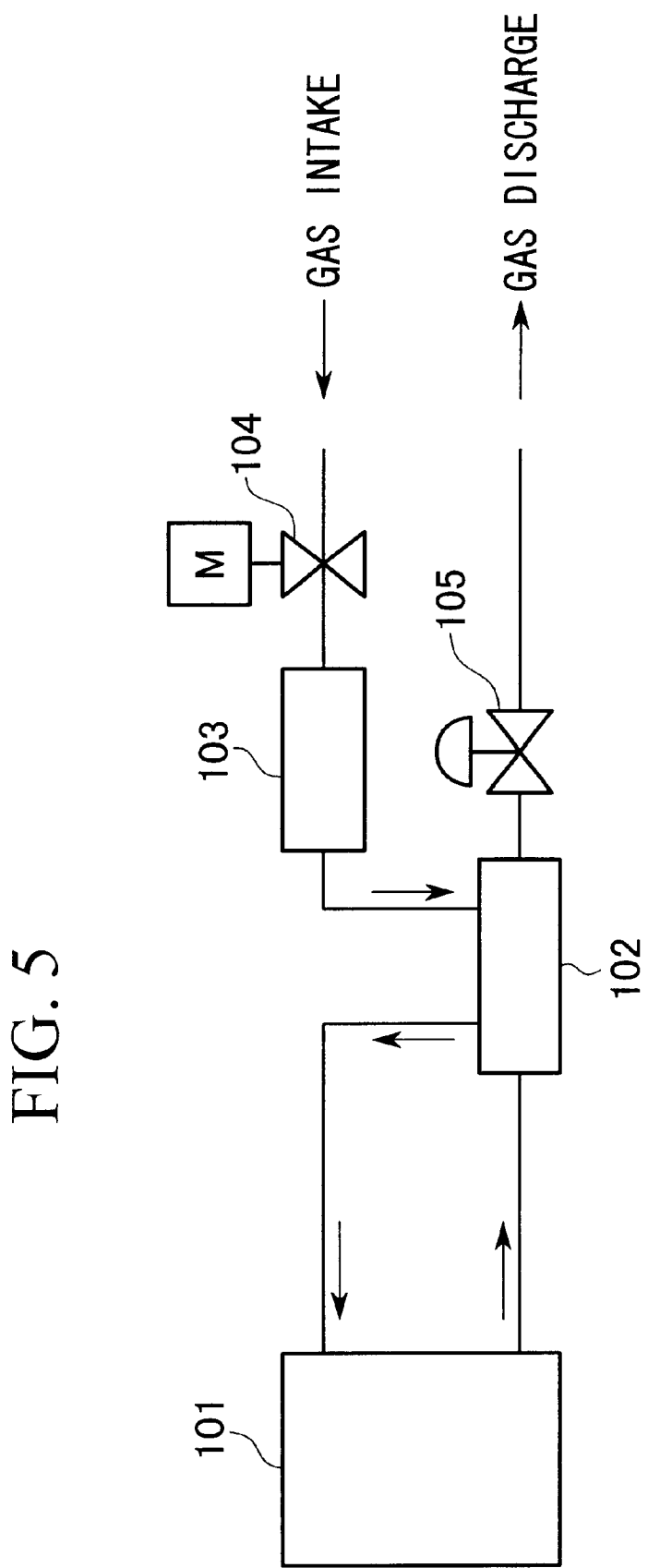
FIG. 5 is a system block diagram showing a conventional example of humidifying system for a fuel cell.

FIG. 1 is a system block diagram of a humidifying system for a fuel cell according to the first embodiment of the present invention. FIG. 2 is a perspective view of the humidifier. FIG. 3 is a perspective view of a module disposed in the humidifier. FIG. 4 is a longitudinal sectional view of the humidifier. In these figures, reference numeral 1 indicates a solid polymer electrolyte-type fuel cell (hereinafter simply referred to as a "fuel cell", 2 indicates a heat exchanger, 3 indicates a supercharger, 4 indicates a humidifier, 5 indicates piping for air, and 6 indicates piping for exhaust gas.

First, a general structure of the humidifying system for a fuel cell according to this embodiment will be explained using FIG. 1.

To the fuel cell 1, the piping 5 for air, which supplies outside air (gas to be humidified) taken in as an oxidizer from a gas intake opening 11 to the fuel cell 1, and the piping 6 for exhaust gas, which discharges from a gas discharge opening 12 the exhaust gas which is released from the fuel cell 1, are connected.

A resonator 13, a filter 14, a humidifier 4, a flow rate sensor 15, a supercharger 3, a temperature sensor 16, a heat exchanger 2, and a pressure sensor 17 are connected by the piping 5 for air in this order from upstream to downstream of the flow of the air from outside, i.e., from the gas intake opening 11 to the fuel cell 1.

On the other hand, a humidifier 4, a pressure-regulating valve 18, and a silencer 19 are connected by the piping 6 for exhaust gas in this order from upstream to downstream of the flow of the exhaust gas, i.e., from the fuel cell 1 to the gas discharge opening 12.

The air from outside, which is taken in from the gas intake opening 11, i.e., dry air, gathers moisture from the exhaust gas released from the fuel cell 1 to form highly wet air in the humidifier 4 which communicates with both the piping 5 for air and the piping 6 for exhaust gas, and the highly wet air is supplied to the fuel cell 1.

This highly wet air is used together with hydrogen, which is supplied from a high-pressure hydrogen tank (not shown in the drawings) to the fuel cell 1, for generating electric power. In addition, the highly wet air is used for supplying moisture for maintaining the solid polymer membrane inside the fuel cell 1 in a water-saturated condition.

For convenience, in the following explanation, the air from outside is referred to as "dry air Ad" after it is taken in from the gas intake opening 11 for gas and until it is humidified in the humidifier 4; the air is then referred to as "highly wet air Aw" after it is humidified in the humidifier 4, the exhaust gas is referred to as "wet exhaust gas Ow" after it is released, with a great amount of moisture contained, from the fuel cell 1 and until it is used for humidification in the humidifier 4; and the exhaust gas is then referred to as "dry exhaust gas Od" after it is used for humidification in the humidifier 4.

Next, components of the humidifying system for the fuel cell according to this embodiment will be explained.

The humidifier 4 is of a water permeable type in which hollow fiber membranes are used as water permeable membranes. As shown in FIGS. 2 and 4, the humidifier 4 comprises two cylindrical modules 21 and a casing 22 for housing these modules.

As shown in FIG. 3, the structure of the module 21 is such that a bundle 23 of hollow fiber membranes gathered in a cylindrical shape is housed in a cylindrical steel jacket 24.

In an end portion of the jacket 24, a plurality of inflow openings 25 for the gas to be humidified are formed along circumferential direction so as to introduce the dry air Ad from the gas intake opening 11.

In addition, in the other end portion of the jacket 24, a plurality of outflow openings 26 for the humidified gas are formed along circumferential direction so as to allow the highly wet air Aw to flow out of the jacket 24, the highly wet air Aw being formed by introducing the dry air Ad through the inflow openings 25 for the gas to be humidified into the jacket 24 and by allowing the dry air Ad to flow in the longitudinal direction of the jacket between the inner surface of the jacket 24 and the hollow fiber membranes and between the hollow fiber membranes.

In a module supporting member 31 for supporting an end of the module 21, an exhaust gas introduction path 33, which directs the wet exhaust gas Ow from the fuel cell 1 toward an open end (hereinafter referred to as "exhaust gas inflow opening 32") of the module 21, and a humidified gas withdrawal path 34, which directs the highly wet air Aw flowing out from the outflow openings 26 for the humidified gas toward outside of the humidifier 4, are formed.

The piping 6 for exhaust gas is connected to the exhaust gas introduction path 33, and the piping 5 for air is connected to the humidified gas withdrawal path 34.

In a module supporting member 32 for supporting the other end of the module 21, an exhaust gas withdrawal path 42, which directs the dry exhaust gas Od flowing inside inner hollow portions of the hollow fiber membranes and flowing out from the other open end (hereinafter referred to as "exhaust gas outflow opening 41") of the module 21 toward outside of the humidifier 4, and an introduction path 43 for gas to be humidified, which directs the dry air Ad from the gas intake opening 11 toward the inflow openings 25 for gas to be humidified, are formed.

The piping 6 for exhaust gas is connected to the exhaust gas withdrawal path 42, and the piping 5 for air is connected to the introduction path 43 for gas to be humidified.

The supercharger 3 is driven by a motor 46 to take in the dry air Ad for the gas intake opening 11 and to compress the dry air Ad thus taken in and convey it to the subsequent step.

In this embodiment, this supercharger 3 is disposed downstream of the humidifier 4 in the direction of air flow from outside, that is, between the inlet 47 for introducing the wet gas into the fuel cell 1 and the outlet 48 for releasing the wet gas from the humidifier 4.

The intercooler 2 is a heat exchanger for reducing the temperature of the highly wet air Aw, which is increased due to the compression by the supercharger 3, within an operational temperature range for the fuel cell 1.

Therefore, the highly wet air Aw flowing out of the supercharger 3 is cooled by the intercooler 2 to a predetermined operational temperature, and then conveyed to the fuel cell 1.

It should be noted that the intercooler 2 is controlled by outputs from a temperature sensor 16.

With the humidifying system for a fuel cell having the above constitution, when the supercharger 3 is driven by motor, dry air Ad is taken through the gas intake opening 11 into the piping 5 for air, and this dry air Ad passes the resonator 13 and the filter 14 to be supplied to the humidifier 4.

At this time, since the humidifier 4 is supplied with the wet exhaust gas Ow from the fuel cell 1 through the piping 6 for exhaust gas, transfer of moisture from the wet exhaust gas Ow to the dry air Ad is carried out.

Specifically, as shown in FIG. 4, the wet exhaust gas Ow flows in the exhaust gas introduction path 33 formed in one of the module supporting members 31, through the exhaust gas inflow opening 32, and into the module 21, while the dry air Ad flows in the introduction path 43 for gas to be humidified formed in the other module supporting member 32, through the inflow openings 25 for gas to be humidified formed in the jacket 24, and into the module 21.

The wet exhaust gas Ow introduced into the module 21 is distributed to the inner hollow portion of each hollow fiber membrane and flows in the longitudinal direction of the module 21. The dry air Ad introduced into the module 21 flows in the longitudinal direction of the module 21 between the inner surface of the jacket 24 and the hollow fiber membranes and between the hollow fiber membranes.

At this time, since there is a difference in the water vapor partial pressure between the wet exhaust gas Ow, which flows inside the hollow fiber membranes, and the dry air Ad, which flows outside the hollow fiber membranes, this difference in the water vapor partial pressure works as driving force to allow water to penetrate the hollow fiber membranes, and water is transferred from the wet exhaust gas Ow to the dry air Ad.

As a result, the dry air Ad is humidified to form the highly wet air Aw, while the wet exhaust gas Ow is dehumidified to form the dry exhaust gas Od.

With the humidifying system for the fuel cell according to this embodiment, since the supercharger 3 is disposed downstream of the humidifier 4 in the direction of air flow, the flow velocity of the dry air Ad which flows inside humidifier 4 can be increased in comparison with a conventional humidifying system for a fuel cell, in which a super charger 3 is disposed upstream of the humidifier 4 in the direction of air flow.

Figure 6:
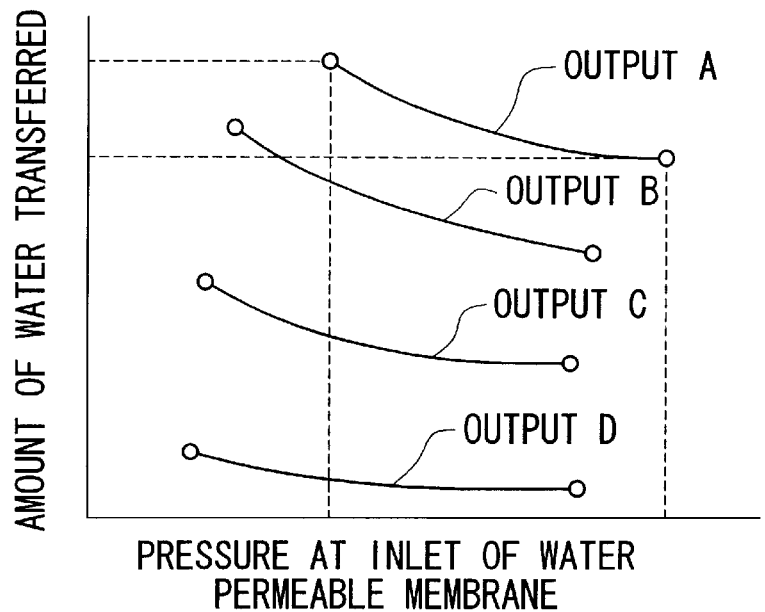
FIG. 6 is a graph showing a pressure-dependent property of hollow fiber membranes.
Figure 7:
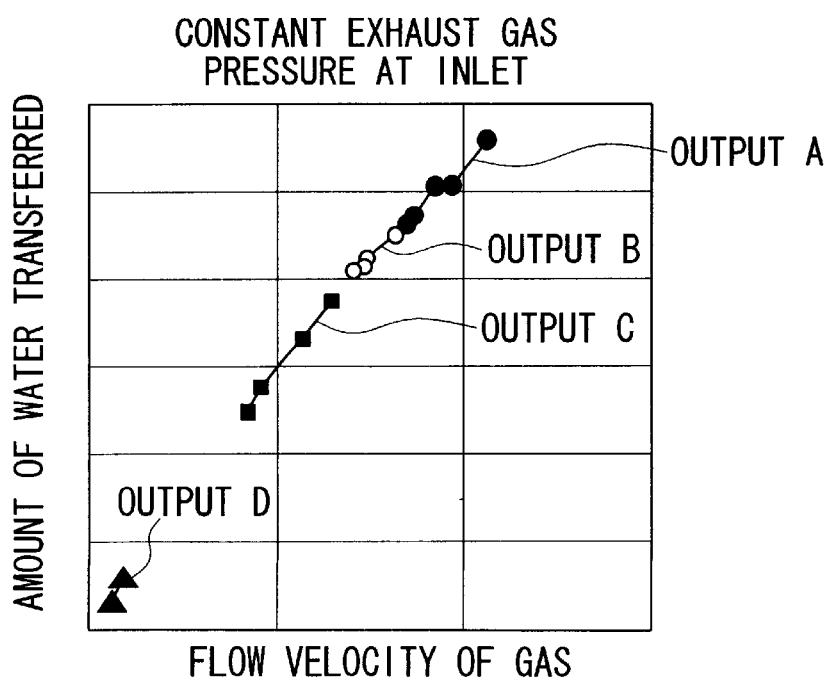
FIG. 7 is a graph showing a water collecting property of hollow fiber membranes using a dry gas.

Accordingly, as is clear from the above formulae (5) and (6) and FIGS. 6 and 7, since the amount of water traferred from the wet exhaust gas Ow to the dry air Ad is increased, and the efficiency of humidification is improved, the sizes of the humidifier 4 and the supercharger 3 can be reduced.

Moreover, since the supercharger 3 is supplied with the highly wet air Aw, the efficiency of supercharging can be improved.

The dry exhaust gas Od flows through the exhaust gas outflow opening 41 to the outside of the module 21, then flows in the exhaust gas withdrawal path 42, and flows into the piping 6 for exhaust gas again. The highly wet air Aw flows through the openings 26 for humidified gas to the outside of the module 21, then flows in the humidified gas withdrawal path 34, and flows into the piping 5 for air again.

The dry exhaust gas Od, which flows into the piping 6 for exhaust gas again, further flows through a pressure-regulating valve 18 and a silencer 19, and discharged form the gas discharge opening 12. The highly wet air Aw, which flows into the piping 5 for air again, is cooled by intercooler 2 to a predetermined temperature, and supplied to a path for oxidizer formed as a groove on the side which is in contact with a cathode electrode of the fuel cell 1.

The highly wet air Aw is used together with hydrogen, which is supplied from a high-pressure hydrogen tank not shown in the drawings, for generating electric power. In addition, the highly wet air is used for supplying moisture for maintaining the solid polymer membrane in a water-saturated condition.

What is claimed is:

1. A humidifying system for a fuel cell, the system producing a wet gas by allowing a gas, which is to be humidified, to pass through a water permeable humidifier, and supplying the wet gas to a fuel cell, the humidifying system comprising a supercharger disposed between an inlet for introducing the wet gas into the fuel cell and an outlet for releasing the wet gas from the humidifier, wherein the supercharger increases a flow velocity of the gas to be humidified passing through the humidifier.

2. A humidifying system for a fuel cell according to claim 1, wherein the humidifier is one comprising a water permeable hollow fiber membrane.

3. A humidifying system for a fuel cell according to claim 2, wherein the humidifier has a structure in which the gas to be humidified is allowed to be in contact through the hollow fiber membrane with an exhaust gas from the fuel cell.

4. A process for humidifying a fuel cell having a humidifying step in which a gas to be humidified is allowed to pass through a water permeable humidifier to generate a wet gas, and a step of supplying the wet gas to the fuel cell, wherein the process further comprising a supercharging step in which the wet gas is introduced into a supercharger to increase a flow velocity of the gas to be humidified passing through the humidifier and conveyed by compression toward the fuel cell.

5. A process for humidifying a fuel cell according to claim 4, wherein the humidifying step is a step in which the gas to be humidified is brought into contact through a water permeable hollow fiber membrane in the humidifier with an exhaust gas from the fuel cell.

6. A method for humidifying a fuel cell, comprising humidifying a gas by passing the gas through a humidifier to produce a wet gas, increasing a flow velocity of the gas passed through the humidifier, and conveying the wet gas to the fuel cell.

7. The method of claim 6, wherein the step of increasing further comprises the step of passing the wet gas through a supercharger.

8. The method of claim 7, wherein the step of conveying further comprises the step of the wet gas prior to introduction to the fuel cell.

* * * * *